Patented Aug. 3, 1954

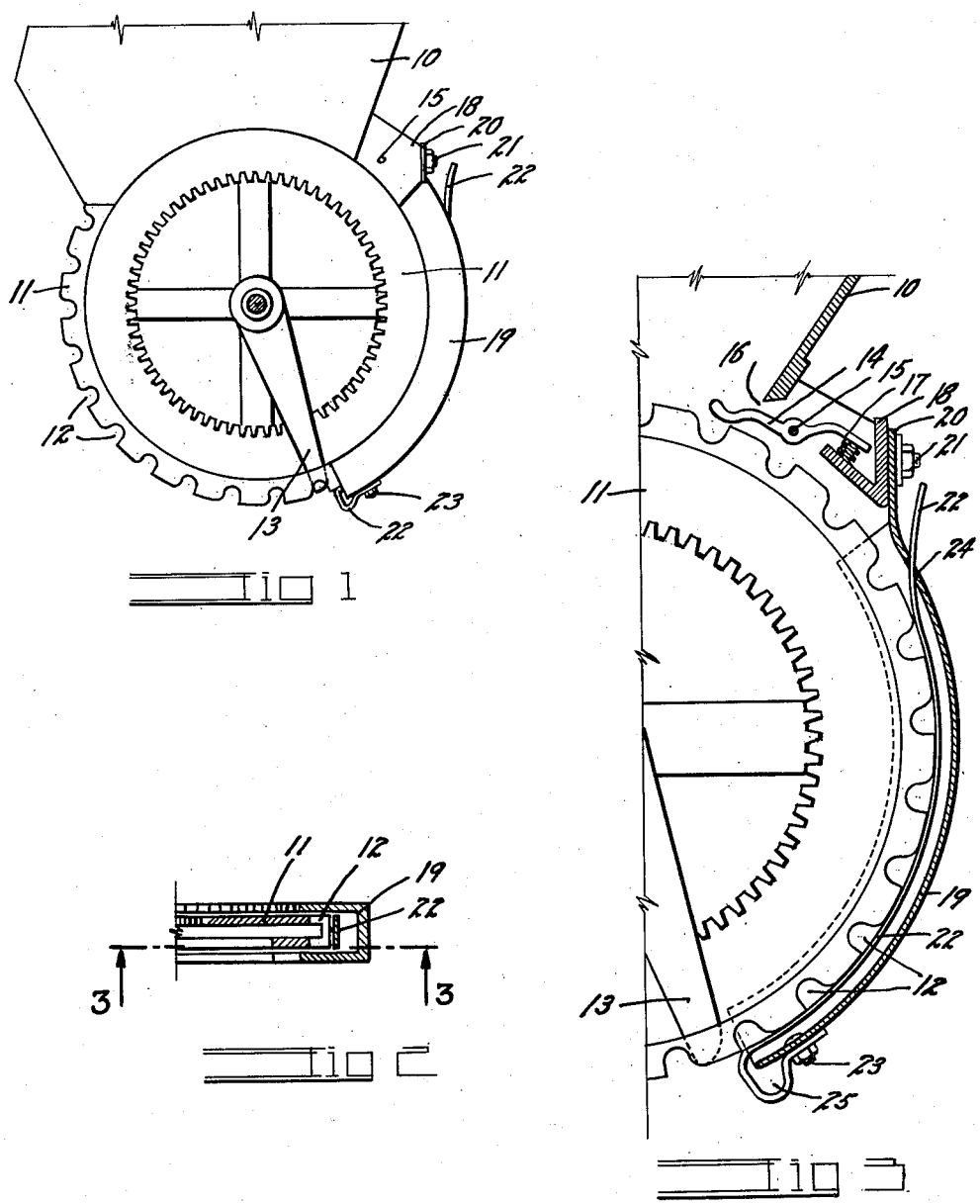

2,685,390

UNITED STATES PATENT OFFICE 2,685,390

SEEDING WHEEL WITH MEANS FOR RETAINING THE SEEDS IN NOTCHES OF THE WHEEL

Paul E. Milton, King City, Calif.

Application December 29, 1952, Serial No. 328,273

2 Claims. (Cl. 222—338)

1

This invention relates to a plant seeding device, and more particularly to improvements in seeders as described and illustrated in applicant's prior Patents Nos. 2,496,885 and 2,535,222.

One objection to the present conventional seeders resides in the fact that they will not efficiently accommodate seeds of varying sizes. For instance, a seeder wheel guide set for small seeds, such as cotton seeds, will become clogged if attempts are made to use the seeder for seeding sugar beets. The principal object of this invention is to provide automatically and inherently adjustable means for retaining the seeds in the seed notches of a seeder wheel, regardless of variations in the size of the seeds and without the necessity for manual adjustment.

Another object is to so construct the seed-retaining device that it will be automatic, foolproof, long wearing, and of greater simplicity than present seed-retaining means.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a face view of a conventional seeder wheel of the type employed in applicant's prior patents, illustrating the improved seed-retaining device in place thereon;

Fig. 2 is an enlarged, detail, horizontal section, taken on the line 2—2, Fig. 1; and Fig. 3 is a vertical section, taken on the line 3—3, Fig. 2.

In the drawing, conventional parts of a seeder are designated by numeral as follows: hopper 10, seed discharge opening 16, seed wheel 11, seed-receiving notches 12, and seed ejector 13. This invention is designed to properly place seeds from the hopper 10 into the seed notches 12 and to resiliently retain the seeds in place in their respective notches until they reach the ejecting position.

In this invention, the seeds are distributed into the notches 12 by means of a yieldable tilting lever 14 mounted on a pivot pin 15. The forward extremity of the lever 14 projects into the discharge opening 16 in the seed hopper 10 and vibrates and shears off the pile of seeds to place the required seeds in the notches of the moving

2 edge of the seed wheel. This forward extremity is rounded so that it will ride over the notches 12 as they pass to force the seeds into the notches. The forward extremity also serves as a sweep to sweep excess seeds back from the notches and to vibrate the seeds at the discharge opening to prevent packing. The outer extremity of the tilting lever 14 is constantly urged upwardly by means of a compression spring 17 to maintain the inner extremity in contact with the periphery of the seed wheel. The conventional seed hopper of this type is provided with a hopper flange 18 against which the spring 17 acts.

The seeds are usually retained in their notches during the downward travel of the seed wheel edge by means of a channel-shaped, arcuate retaining chute 19 which is attached to the seeder in any desired manner. As illustrated, the chute 19 is attached by means of an upwardly projecting ear 20 formed on the chute and attached to the flange 18 by means of a suitable attachment stud 21. The usual chute 19 follows the contour of the seed wheel in closely spaced relation to the latter. The conventional arcuate chutes have not been satisfactory, since large seeds either become clogged in the chute or act to force the chute away from the periphery of the seed wheel to allow the smaller seeds to fall from their notches.

In this invention the conventional seed-retaining chute 19 is still used, but the latter is fixedly mounted spaced from the wheel periphery a distance equal to or in excess of the diameter of the largest expected seed.

A flexible, resilient, metallic ribbon or elongated leaf spring 22 is attached adjacent the lower discharge extremity of the chute 19 such as by means of a suitable attachment bolt 23. The resilient ribbon 22 is looped at its attached extremity to enhance the resiliency and extends first downwardly and rearwardly, thence upwardly and into the channel of the retaining chute 19. The resilient ribbon follows the channel of the chute 19 to a position adjacent the top thereof, where it projects outwardly through an opening 24 in the chute.

The resiliency of the ribbon 22 is such that if the seeding wheel 11 were not in place in the chute 19, the ribbon would normally extend in a straight line from its lower curved portion to and through the opening 24. The seeding wheel, however, forces the normally straight, resilient ribbon into an arcuate shape, as shown in Fig. 2, so that the ribbon will lie snugly against the periphery of the seeding wheel for an arc of approximately 90°.

The seeds traveling downwardly contact and slide along the ribbon and force the latter outwardly in proportion to the size of the individual seeds, without forcing the ribbon away from the seeds in the adjacent notches. When the arcuate bend 25 in the ribbon is reached, the seeds are free to fall or be ejected by the conventional seed ejector 13.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A seed-retaining device for seeders of the type having a rotating seed wheel provided with peripheral seed-receiving notches, comprising: a normally substantially straight, resiliently flexible ribbon, the mid-portion of said ribbon lying against the periphery of said seed wheel over said notches, said seed wheel acting to flex said ribbon in an arc corresponding to the circumference of said seed wheel; means securing one extremity of said ribbon in fixed position relative to said seed wheel; and means for slidably retaining the other extremity of said ribbon.

2. A seed-retaining device as described in claim 1 in which the means for fixedly securing said ribbon is positioned at the lowermost extremity of said ribbon.

References Cited in the file of this patent

UNITED STATES PATENTS

| Number | Name | Date |
|---|---|---|
| 693,158 | Roebuck et al. | Feb. 11, 1902 |
| 1,997,791 | Hoberg et al. | Apr. 16, 1935 |

FOREIGN PATENTS

| Number | Country | Date |
|---|---|---|
| 363,342 | Italy | Oct. 3, 1938 |